April 29, 1947.    T. J. WILLIAMS    2,419,667
PROCESS FOR THE ISOMERIZATION OF NORMAL PARAFFINS
Filed July 13, 1940
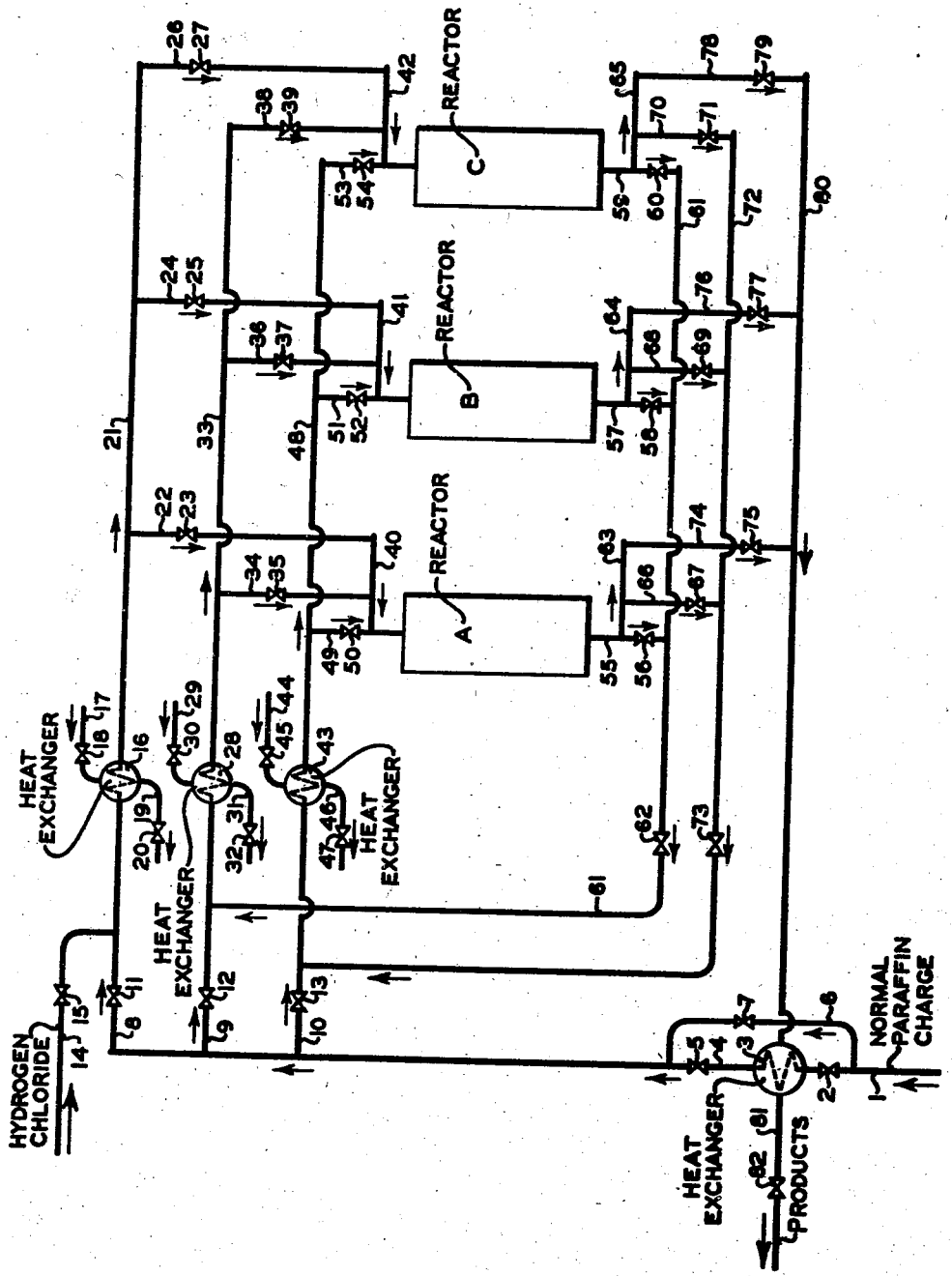
INVENTOR
THOMAS J. WILLIAMS
BY
ATTORNEY Patented Apr. 29, 1947

2,419,667

UNITED STATES PATENT OFFICE 2,419,667

PROCESS FOR THE ISOMERIZATION OF NORMAL PARAFFINS

Thomas J. Williams, Chicago, Ill., assignor to Universal Oil Products Company, Chicago, Ill., a corporation of Delaware Application July 13, 1940, Serial No. 345,337

13 Claims. (Cl. 260—683.5)

This invention relates to a process for the isomerization of straight chain normal paraffins into branch chain iso-paraffins and more specifically to a multiple stage process wherein the hydrocarbons are isomerized in the presence of metal halide catalysts of increasing activity with a decreasing concentration of hydrogen chloride.

In processes employing aluminum chloride as a catalyst in the isomerization of normal paraffins to iso-paraffins, it has been found that as the catalyst activity decreases, in order to obtain a relatively uniform degree of conversion, the concentration of hydrogen chloride which although not used up in the process aids in promoting the desired reaction and in sustaining catalyst activity, should be increased or at least its partial pressure in the reacting mixture should be increased. Various processes have been developed which provide for increasing hydrogen chloride concentration as the catalyst activity begins to decrease and, in most cases, this is accomplished by gradually increasing the amount of hydrogen chloride added to the mixture undergoing treatment.

My invention provides a novel method for accomplishing the purpose above mentioned while maintaining the quantity of hydrogen chloride added substantially constant and while conducting the reaction in a plurality of stages of increasing catalyst activity. The object is accomplished by dividing the charge into a plurality of separate streams preferably corresponding in number to the number of reaction zones and, in most cases, equal in amount. In such cases, all of the hydrogen chloride supplied to the system is commingled with the stream introduced to the first reaction zone which contains the least active catalyst. All of the reaction products leaving the first reaction zone are commingled with another of the streams and the mixture introduced to the second reaction zone, this procedure being carried through to the last zone which contains the most active catalyst and wherein the concentration of hydrogen chloride is the lowest.

In the preferred operation the pressure at the inlet of the first reaction zone is maintained sufficiently high to provide for the pressure drop in the system and, in addition, to provide for an outlet pressure from the last reaction zone which is sufficient to effect condensation of the condensible products and particularly hydrogen chloride by ordinary means, such as by water cooling or by refrigeration. In addition, it is desirable to employ a relatively high inlet pressure in the first reaction zone with provisions for decreasing the pressure between the various reaction zones by means of pressure control valves in order that the partial pressure of hydrogen chloride in each zone may be controlled within definite limits not only by decreasing the concentration thereof but also by decreasing the total pressure in each specific zone.

In addition to what has been mentioned above, the invention provides for individual temperature control on the stream of reactants introduced to each reaction zone whereby optimum temperatures may be employed in each reaction zone with catalysts of varying degrees of activity. Once the optimum temperature for conversion in each reaction zone is determined it is understood from then on the temperature of each stream of reactants may be maintained substantially constant, although if desired the temperature may be made to vary over a suitable range as the activity of the catalyst in each reactor decreases.

In one specific embodiment the invention comprises dividing hydrocarbon reactants into a plurality of separate streams corresponding to a number of reaction zones and substantially equal in amount, commingling hydrogen chloride with the first stream, heating the mixture to a conversion temperature and introducing the heated mixture to the first reaction zone containing a bed of isomerizing catalyst of the lowest activity, commingling the reaction products from the first mentioned reaction zone with a second stream of hydrocarbon reactants and supplying this mixture after heating to a conversion temperature to a second reaction zone containing catalyst of a higher activity than that in the first mentioned reaction zone, repeating the operation as set forth above through the final stage which contains the most active catalyst, separating unused hydrogen chloride from the final reaction products, returning said hydrogen chloride for further use, and recovering substantially hydrogen chloride free reaction products.

The accompanying diagrammatic drawing illustrates in conventional side elevation one specific form of the apparatus which may be employed to accomplish the objects of the invention. The apparatus illustrated herein and subsequently described is shown as consisting of three reaction stages merely for the purpose of simplifying such description, and it is to be understood that a greater or lesser number may be employed, when desired, without departing from the broad scope of the invention.

As a further simplification the description which follows relates primarily to the isomerization of normal butane to iso-butane. The process, however, is not limited in this respect, for it may also be employed for the isomerization of normally liquid paraffins and, in such cases, substantially the same catalyst and conditions of temperature and pressure may be employed.

Referring to the drawing, normal butane is supplied to the system through line 1 at a pressure ranging, for example, from 100 to 750 pounds or more square inch and may be directed through valve 2 into heat exchanger 3 where it passes in indirect heat exchange relationship with products of the process supplied to this heat exchanger in the manner to be described. The preheated normal butane leaving heat exchanger 3 is directed through line 4 containing valve 5 for treatment in the manner to be described. When no heating of the normal butane charge is necessary or desirable, the normal butane in line 1 may be directed through line 6 containing valve 7 bypassing heat exchanger 3, after which it is introduced to line 4 at a point beyond the heat exchanger or, when desired, a portion of the normal butane charge may be introduced to heat exchanger 3, the residual portion thereof bypassing heat exchanger 3 in the manner described as a means of temperature control.

Normal butane in line 4, with or without preheating, is divided into a plurality of streams preferably corresponding to the number of reaction zones, the number in the case here illustrated being three, by directing regulated portions of the normal butane in line 4 into lines 8, 9, and 10. Preferably also, in order to accurately control the amount of normal butane diverted into lines 8, 9, and 10, each of these lines may be provided with an automatically operated flow control valve which is controlled in response to an orifice reading taken from an orifice meter installed in each of the separate lines. In such cases, the amount diverted through each of the separate lines may be substantially equal or, when desired, the amount may be made to vary to suit requirements. For the purpose of this invention, however, valves 11, 12, and 13 in respective lines 8, 9, and 10 are shown as the ordinary type valve, since it is not the purpose of this invention to intentionally limit its scope to forms of apparatus which are well known in the art.

For the purpose of illustration, reactor C contains the most active catalyst, reactor B catalysts of a lesser activity, and reactor A the least active catalyst. In addition, lines 21, 33, and 48 communicating with lines 8, 9, and 10, respectively, are the manifold or supply lines for the hydrocarbon reactants and, in the case here illustrated, line 21 is a supply line for the reactants introduced to the reactor containing the least active catalyst, line 33 the supply line for the reactants introduced to the reactor containing the catalyst of an intermediate activity, and line 48 the supply line for the reactants introduced to the reactor containing the catalyst of the highest activity. Lines 61, 72, and 80 are the manifold lines for the products of the reaction leaving each of the reactors, line 61 the manifold line for the products leaving the reactor containing the least active catalyst, line 72 the manifold line for the products leaving the reaction zone containing the catalyst of an intermediate activity, and line 80 constituting the manifold for the final reaction products leaving the reaction zone containing the catalyst of the highest activity.

Reactors A, B, and C may comprise any of the well known types of reactors such as, for example, cylindrical vessels substantially completely filled with the isomerization catalyst or, when desired, the reactors may be provided with means for cooling, since the reaction is slightly exothermic. Reactors of the latter type may comprise, for example, one in which catalyst is contained in a plurality of relatively small diameter tubes surrounded by a suitable heat convective medium which may be maintained in substantially the liquid phase at the temperatures and pressures employed and by means of which heat is removed by vaporization. Various other forms of reactors well known to those skilled in the art may be employed, however, without departing from the broad scope of the invention.

Hydrogen chloride supplied through line 14 containing valve 15, which may comprise, for example, fresh hydrogen chloride introduced from an exterior source, or hydrogen chloride separated from the reaction products leaving the final stage of the process, is commingled with the hydrocarbon reactants in line 8 in an amount ranging, for example, from 2 to 30 mol percent concentration in the resulting mixture. The resulting mixture in line 8 is introduced to heat exchanger 16 and heated therein to the desired conversion temperature ranging, for example, from 150 to 400° F. by indirect heat exchange with a fluid heating medium such as steam supplied by way of line 17 and valve 18 and withdrawn by way of line 19 and valve 20. The heated mixture leaves heat exchanger 16 by way of line 21 which constitutes the manifold or supply line for the reactor containing the least active catalyst. In the case here illustrated, the mixture in line 21 is directed through line 22 containing valve 23 into line 40, thence into line 49 by means of which it is supplied to reactor A.

Catalysts which have been found to be effective for the isomerization of normal paraffins to isoparaffins may comprise, for example, aluminum chloride or a mixture of aluminum chloride with copper or zirconium chlorides preferably supported on a carrier such as carbon, pumice, various types of fuller's earth, and clays, particularly those of the montmorillonite and bentonite types, either raw or acid treated diatomaceous earth, silica-alumina composites, unglazed porcelain, firebrick, etc. Other catalysts employing aluminum chloride as its active ingredient and well known to those skilled in the art may also be employed in the process of this invention without departing from its broad scope.

Reaction products leaving reactor A are directed through line 55 containing valve 56 into line 61, containing valve 62 after which they are conducted into line 9 where they commingle with the second stream of hydrocarbon reactants therein. In addition, valve 62 may constitute a pressure reducing valve by means of which the pressure between the first and second stage of the process may be reduced to the optimum for the second stage of the process and as a further means for controlling the partial pressure of the hydrogen chloride in the mixture supplied to the second stage in addition to the dilution effect of the added hydrocarbon reactants commingled with the reaction products prior to their introduction to the second stage.

The mixture of reaction products and fresh hydrocarbon reactants in line 9 containing a lower concentration of hydrogen chloride and at a lower pressure than the stream of reactants supplied to reactor A and consequently a lower hydrogen chloride partial pressure are supplied to heat exchanger 28 wherein they are heated to the optimum conversion temperature for the second stage of the process by indirect heat exchange with a fluid heat convective medium such as steam supplied to exchanger 28 by way of line 29 and valve 30 and removed therefrom by way of line 31 and valve 32. The heated mixture leaves heat exchanger 28 by way of line 33 and, in the case here illustrated, since reactor B contains the catalyst of a higher activity than that in reactor C, the mixture in line 33 is directed through line 36 containing valve 37 into line 41, thence into line 51 by means of which it is then supplied to reactor B, passing therethrough in contact with the isomerizing catalyst contained therein. The isomerizing catalyst in reactor B is of essentially the same composition as that in reactor A but, as above mentioned, of a greater activity.

The reaction products leaving reactor B are directed through lines 57 and 64 into line 68, thence through valve 69 into line 72. The reaction products in line 72 are directed through valve 73 which, in the case here illustrated, may also comprise a pressure reducing valve by means of which the pressure is reduced between the second and last stage of the process. The reaction products passing through valve 73 are commingled with the fresh stream of hydrocarbon reactants in line 10 wherein by means of the dilution effect and the reduction in pressure the mol concentration of hydrogen chloride in the resulting mixture is reduced and likewise the partial pressure.

The mixture of reaction products and fresh hydrocarbon reactants in line 10 is introduced to heat exchanger 43 wherein it is heated to a temperature optimum for conversion in the last stage of the process containing the most active catalyst. Heating in heat exchanger 43 may be accomplished by passing the mixture of reaction products and fresh hydrocarbon reactants in indirect heat exchange relationship with the fluid heat convective medium such as steam supplied to heat exchanger 43 by way of line 44 containing valve 45 and removed therefrom by way of line 46 containing valve 47. The heated mixture leaving heat exchanger 43 is directed through manifold line 48 and, in the case here illustrated, since reactor C contains the most active catalyst this mixture is directed through line 53 containing valve 54 into reactor C. Reactor C, in the case here illustrated, contains a catalyst of substantially the same composition as that employed in reactors A and B but of a higher activity, due to the fact that it has been employed in conversion for a shorter period of time.

The reaction products leaving reactor C are directed through lines 59 and 65 into line 78, passing through valve 79 into line 80 by means of which they are conducted to heat exchanger 3, passing therethrough in indirect heat exchange relationship with the normal butane charge in the manner previously described. The cooled reaction products leaving heat exchanger 3 are directed through line 81 containing valve 82 to suitable separation and recovery equipment wherein hydrogen chloride is recovered from the reaction products and returned for further treatment, when desired, by way of line 14 in the manner previously described. By means of suitable fractionating equipment the normal butane may be separated from the isobutane formed in the process and the former commingled with the fresh charge in line 1 for further treatment in the process.

When the catalyst in reactor A becomes relatively inactive necessitating replacement by a fresh catalyst, this reactor may be cut out of the system and the reaction carried out in the remaining two reactors, such as, in the case here illustrated, or, when desired, the process may be equipped with an extra reactor so that three reactors may be used at all times while the catalyst in the fourth reactor is being replaced and in general undergoing reconditioning. After the used catalyst in reactor A has been replaced with fresh catalyst, the stream of hydrocarbon reactants pass first through reactor B, thence through reactor C, and finally through reactor A.

With the change in sequence of the reactors as above mentioned, the flow of hydrocarbon reactants will be substantially as related in the description which follows. Hydrocarbon reactants in admixture with hydrogen chloride supplied to line 21 in the manner previously described are directed through line 24 and valve 25 into line 41, thence into line 51 by means of which they are supplied to reactor B. The products of the reaction leaving reactor B are directed through line 57 and valve 58 into line 61, thence through valve 62 into line 9, commingling therein with another portion of hydrocarbon reactants, and the mixture subsequently passing through heat exchanger 28 in the manner previously described into manifold line 33. The mixture in manifold line 33 is directed through line 38 and valve 39 into line 42, thence into line 53 by means of which it is introduced to reactor C. The products of the reaction leaving reactor C by way of line 59 are directed through line 65 into line 70 and thence through valve 71 into manifold line 72. The products in line 72 are directed through valve 73 into line 10, commingling therein with the final portion of hydrocarbon reactants. This mixture passes through heat exchanger 28 into manifold line 48. The heated reactants are then directed through line 49 and valve 50 into reactor A. The products leaving reactor A are directed through lines 55 and 63 into line 74, pass through valve 75 into manifold line 80, the flow thereafter being subsequently as described.

After the catalyst in reactor B has been replaced with fresh catalyst the flow will be substantially as follows: The mixture of hydrocarbon reactants and hydrogen chloride supplied to manifold line 21 in the manner previously described is directed through line 26 and valve 27 into line 42, thence into line 53 by means of which it is supplied to reactor C. The reaction products leaving reactor B are directed through line 59 containing valve 60 into manifold line 61, pass through valve 62 into line 9 where they commingle with another portion of the fresh reactants. This mixture is directed through heat exchanger 28 into manifold line 33 in the manner previously described. The mixture in manifold line 33 is directed through line 34 containing valve 35 into line 40, thence into line 49 by means of which it is supplied to reactor A. The reaction products leaving reactor A are directed through lines 55 and 63 into line 66 after which pass through valve 67 into manifold line 72. The reaction products in line 72 are directed through valve 73 into line 10, commingling therein with the final portion of the hydrocarbon reactants. This mixture in line 10 is directed through heat exchanger 43 into line 48 in the manner previously described. The mixture in manifold line 48 is directed through line 51 containing valve 52 into reactor B. The final reaction products of the isomerization treatment leaving reactor B are directed through lines 57 and 64 into line 76 and pass through valve 77 into manifold line 80, the treatment thereafter being substantially as described.

It is to be understood that the invention is not limited to any specific number of catalytic reactors, such as the three herein illustrated and described, but may employ a greater or lesser number, when desired. It is further understood that heat exchangers 16, 28, and 43 may be equipped for cooling the various streams of hydrocarbon reactants in place of heating the same. Since the reaction is to some extent exothermic cooling instead of heating may be desirable in some instances.

The following is an example of one specific operation of the process as it may be accomplished in an apparatus such as illustrated and above described: Charging stock comprising essentially normal butane is supplied to the process at the approximate rate of 233 mols per hour and is preheated to a temperature of approximately 110° F. by indirect heat exchange with the products formed in the process. The preheated stream of reactants is divided into three substantially equal streams, the first comprising, for example, 77.7 mols, the second 77.6 mols, and the third 77.6 mols. The first stream of hydrocarbon reactants is commingled with approximately 29.9 mols of recycle gases of which approximately 58% is hydrogen chloride. In the usual operation regulated portions of these recycle gases are withdrawn from the process and hydrogen chloride added to the balance to maintain the percentage at approximately 58%. The resulting mixture containing approximately 16 mol per cent hydrogen chloride is heated to a temperature of approximately 230° F. while maintaining a superatmospheric pressure of 270 pounds per square inch. This mixture is supplied to the reaction zone containing an isomerizing catalyst, the latter consisting essentially of aluminum chloride on an activated carbon support. The catalyst in this first reactor is one which has been employed in the process for the longest period of time and therefore is the least active of all.

The reaction products leaving the first reactor are commingled with the second stream of hydrocarbon reactants of approximately 77.6 mols and this mixture is thereafter heated to a temperature of 205° F. while being maintained at a superatmospheric pressure of 230 pounds per square inch. This mixture contains approximately 9.2 mol per cent hydrogen chloride and is supplied to a second reaction zone containing an isomerizing catalyst more active than that in the first mentioned reaction zone.

The reaction products leaving the second reaction zone are commingled with the third or last stream of hydrocarbon reactants of approximately 77.6 mols and this mixture is heated to a temperature of 190° F., the heated mixture containing approximately 6.5 mol per cent hydrogen chloride is supplied to the third reaction zone containing the most active catalyst at a pressure of 190 pounds per square inch.

The reaction products leaving the last reaction zone are cooled to a temperature preferably on the order of 50° F. to condense substantially all of the condensible materials including hydrogen chloride. This mixture is then supplied to a fractionator wherefrom recycle gases containing a high percentage of hydrogen chloride are removed as overhead vapors and recycled to the process. The hydrogen chloride free reaction products removed as bottoms from the fractionator containing approximately 45% isobutane are recovered as a product of the process.

I claim as my invention:

1. In a process for the isomerization of normal paraffin hydrocarbons wherein a stream of said hydrocarbons is commingled with hydrogen chloride and passed in contact with a series of separate beds of granular isomerizing catalyst of progressively increasing activity under isomerizing conditions to effect the desired conversion, the improvement which comprises dividing the stream of normal paraffin hydrocarbon to be treated into a plurality of separate streams, adding substantially all of the requisite amount of hydrogen chloride to one of the separate streams and passing this mixture in contact with the first of said series of beds of said catalytic material and successively through the remaining beds, and commingling the reaction products leaving each bed of catalytic material with another of the separate streams of hydrocarbons prior to passing them in contact with the next successive bed of catalytic material.

2. In a process for the isomerization of normal paraffin hydrocarbons wherein said hydrocarbons are commingled with hydrogen chloride and the mixture subjected to contact with an isomerizing catalyst under isomerizing conditions in a plurality of reaction zones containing catalyst of increasing activity to effect the desired conversion, the improvement which comprises dividing the stream of hydrocarbons into a plurality of separate streams, adding substantially all of the requisite amount of hydrogen chloride to one of the separate streams and subjecting this mixture to treatment in the first of said plurality of reaction zones and passing it successively through the other reaction zones and commingling the reaction products leaving each reaction zone with another of the separate streams prior to their introduction to the next successive reaction zone.

3. The process defined in claim 2 further characterized in that a progressively lower pressure is maintained on the reacting mixture entering each successive reaction zone.

4. In a process for the isomerization of normal paraffin hydrocarbons wherein said hydrocarbons are commingled with hydrogen chloride and the mixture subjected to contact with an isomerizing catalyst in a plurality of reaction zones containing catalyst of increasing activity to effect the desired conversion, the method of varying the concentration of hydrogen chloride in the reacting mixture as the activity of the catalyst varies which comprises, dividing the hydrocarbons to be treated into a plurality of separate but equal streams, the number of said separate streams being equal to the number of reaction zones employed, adding substantially all of the requisite hydrogen chloride to one of said separate streams and heating it to a conversion temperature and supplying the heated mixture to the reaction zone containing catalyst of the lowest relative activity and thereafter passing it through the remaining reaction zones while commingling the reaction products leaving each reaction zone with another of said separate streams, and heating the mixture to the optimum conversion temperature prior to its introduction to the next successive reaction zone.

5. In the isomerization of normal paraffins wherein paraffins to be isomerized are passed with hydrogen chloride through successive beds of metal halide isomerizing catalyst of increasing activity, the improvement which comprises dividing the paraffins to be treated into a plurality of streams equal in number to the number of said beds and supplying each of the streams to a different one of said beds, adding substantially all of the requisite amount of hydrogen chloride to the paraffinic stream being supplied to the bed of lowest catalytic activity, and commingling reaction products from the last-named bed, including hydrogen chloride, with the paraffinic stream to be supplied to the bed of next higher catalyst activity.

6. The improvement as defined in claim 5 further characterized in that said metal halide comprises aluminum chloride.

7. A process for isomerizing a paraffinic feed stock which comprises passing a portion of said stock serially through a first bed of metal halide isomerizing catalyst and a second bed of metal halide isomerizing catalyst of higher activity than the catalyst of said first bed, maintaining said beds under paraffin isomerizing conditions of temperature and pressure, commingling with said portion of the feed stock being supplied to the first bed a sufficient quantity of a hydrogen halide to promote paraffin isomerization in both of said beds, commingling another portion of said feed stock with the admixed reaction products and hydrogen halide discharging from said first bed, and subjecting the resultant mixture to paraffin isomerization in said second bed under a lower hydrogen halide concentration than prevails in said first bed.

8. In a paraffin isomerizing process wherein paraffinic hydrocarbons are passed together with a hydrogen halide promoter and under isomerizing conditions through a metal halide isomerizing catalyst, the improvement which comprises initially contacting the hydrocarbons with a portion of said catalyst of relatively low activity and subsequently with a portion of the catalyst of higher activity, and maintaining a decreasing gradient of hydrogen halide promoter concentration in the direction of flow of the hydrocarbons through the catalyst.

9. A process for isomerizing paraffinic hydrocarbons which comprises passing a portion of the paraffinic hydrocarbons to be isomerized together with a hydrogen halide promoter and under isomerizing conditions through a series of beds of metal halide isomerizing catalyst of increasing activity, and maintaining a decreasing gradient of hydrogen halide promoter concentration in the direction of flow of the hydrocarbons through the beds by commingling additional portions of the paraffinic hydrocarbons to be isomerized with the effluent of each of said beds except the last of the series.

10. In a paraffin isomerizing process wherein a portion of the paraffinic hydrocarbons to be isomerized is passed together with a hydrogen halide promoter and under isomerizing conditions through a metal halide isomerizing catalyst, the improvement which comprises initially contacting said portion of the hydrocarbons with a portion of said catalyst of relatively low activity and subsequently with a portion of the catalyst of higher activity, and maintaining a decreasing gradient of hydrogen halide promoter concentration in the direction of flow of the hydrocarbons through the catalyst by adding another portion of the paraffinic hydrocarbons to be isomerized to the admixed reaction products and hydrogen halide passing from the first-mentioned portion of the catalyst to the second-mentioned portion of the catalyst.

11. A process for isomerizing a paraffinic feed stock which comprises passing a portion of said stock serially through a first bed of metal halide isomerizing catalyst and a second bed of metal halide isomerizing catalyst of higher activity than the catalyst of said first bed, maintaining said beds under paraffin isomerizing conditions of temperature and pressure, commingling with said portion of the feed stock being supplied to the first bed a sufficient quantity of a hydrogen halide to promote paraffin isomerization in both of said beds, commingling another portion of said feed stock with the admixed reaction products and hydrogen halide discharging from said first bed, and subjecting the resultant mixture to paraffin isomerization in said second bed under a lower partial pressure of hydrogen halide than prevails in said first bed.

12. An isomerization process which comprises passing paraffinic hydrocarbons together with a hydrogen halide promoter and under isomerizing conditions through a series of reaction zones containing metal halide isomerizing catalyst of increasing activity in the direction of flow of said hydrocarbons through the zones, and decreasing the concentration of hydrogen halide promoter in said zones in the direction of flow of the hydrocarbons through the series of zones.

13. An isomerization process which comprises passing paraffinic hydrocarbons together with a hydrogen halide promoter and under isomerizing conditions through a series of reaction zones containing metal halide isomerizing catalyst of increasing activity in the direction of flow of said hydrocarbons through the zones, and decreasing the concentration of hydrogen halide promoter in said zones in the direction of flow of the hydrocarbons through the series of zones by commingling an additional portion of said paraffinic hydrocarbons with the admixed reaction products and hydrogen halide discharging from a zone of lower catalyst activity to a zone of higher catalyst activity.

THOMAS J. WILLIAMS.

REFERENCES CITED

The following references are of record in the file of this patent:

UNITED STATES PATENTS

| Number | Name | Date |
|---|---|---|
| 2,208,362 | Engel | July 16, 1940 |
| 2,216,221 | Bartlett | Oct. 1, 1940 |

FOREIGN PATENTS

| Number | Country | Date |
|---|---|---|
| 823,595 | French | Jan. 22, 1938 |